Feb. 9, 1937. C. B. COATES 2,070,257
POWER APPARATUS
Filed Dec. 3, 1931 2 Sheets-Sheet 2
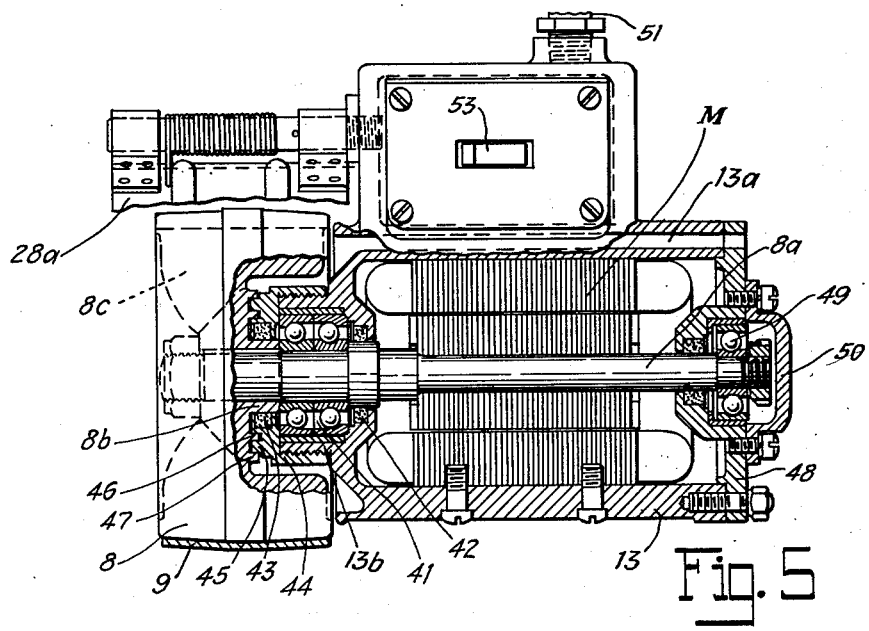
Fig. 5
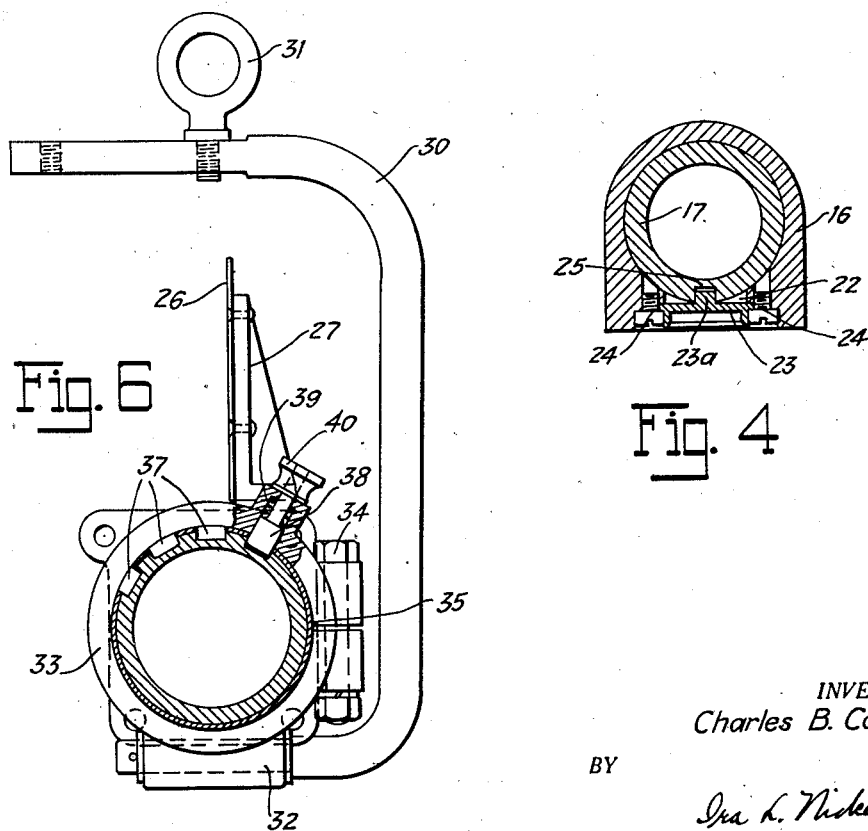
Fig. 6
Fig. 4
INVENTOR.
Charles B. Coates
BY
Ira L. Nickerson
ATTORNEY.

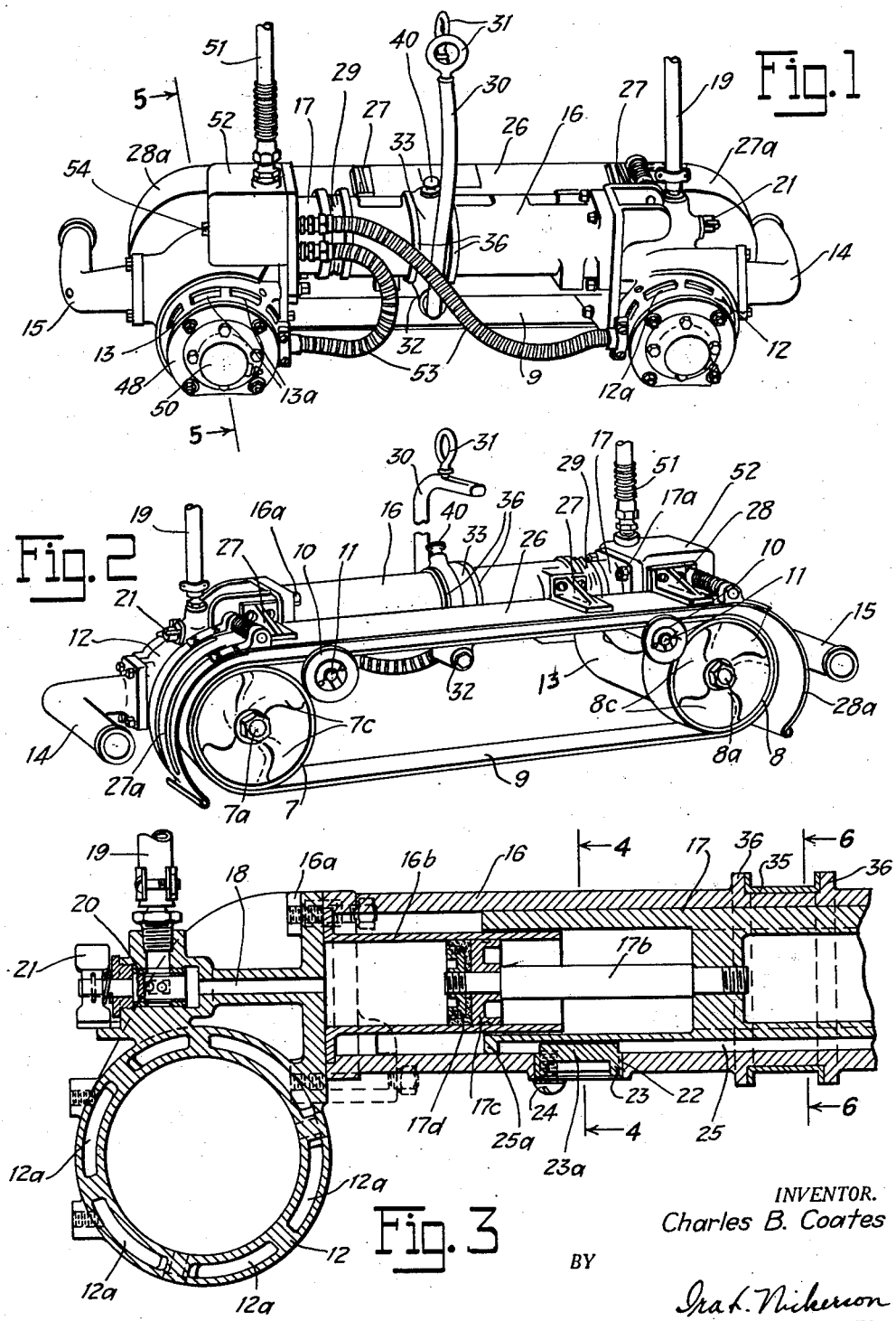

Patented Feb. 9, 1937

2,070,257

UNITED STATES PATENT OFFICE 2,070,257

POWER APPARATUS

Charles B. Coates, Cleveland, Ohio., assignor to Chicago Pneumatic Tool Company, New York, N. Y., a corporation of New Jersey Application December 3, 1931, Serial No. 578,675

7 Claims. (Cl. 51—170)

This invention relates to power apparatus, especially of the portable type, for polishing and grinding. More particularly it concerns apparatus which is hand supported, or at least hand directed, for treating a surface of considerable area through the rubbing or abrading action of a moving endless flexible member or belt which passes over and is supported by spaced pulleys.

One object of the invention is to devise a compact device of the described type which is characterized by simplicity and ruggedness but is light in weight. Another object is to provide improved means for maintaining the flexible member or belt under tension but permitting quick and convenient release when the member or belt is to be changed or replaced. Another object is to provide for suspension of the device and for convenient adjustment of the same to dispose the operating member or belt at any desired angle. Another object is to arrange for adequate cooling of the prime movers which drive the pulleys on which the operating member or belt is supported. Still other objects will be apparent from the detailed description which follows.

The invention provides spaced motors carrying the pulleys on which the belt is mounted, the motors being arranged for movement toward and from each other to tighten or loosen the belt. Each motor has a tubular extension or member arranged for telescoping engagement and with a sliding keyed connection to prevent angular displacement of one motor with respect to the other. Resilient means, preferably compressed air, within the telescoped members yieldingly urges the motors apart to put the belt under tension. The pulleys, which are preferably directly connected to the motors, have spokes in the form of fan blades to impel a current of air over the motors for cooling purposes and the motor casings may be provided with ducts to increase the cooling effect. The motors are so constructed as to be both dust proof and waterproof. The suspension arrangement may take the form of a bail rotatably mounted upon the outer of the telescoping projections or members, and registering means provide for disposing and maintaining the device with the operating belt in different planes and in proper relation to the work.

In order to illustrate the invention one concrete embodiment thereof is shown in the accompanying drawings, in which:

Fig. 1 is a perspective view;

Fig. 2 is a perspective view similar to Fig. 1 but from the other side of the machine;

Fig. 3 is a fragmentary longitudinal sectional view from the left end of Fig. 2 showing the belt tensioning means, the motor parts being omitted;

Fig. 4 is a transverse sectional view substantially on the line 4—4 of Fig. 3;

Fig. 5 is a transverse sectional view substantially on the line 5—5 of Fig. 1; and Fig. 6 is a transverse sectional view through the outer tubular member, as on line 6—6 of Fig. 3 and showing the suspension means in side elevation except for a sectioned portion disclosing the registering plunger in elevation.

As disclosed in perspective in Figs. 1 and 2, the invention is embodied in a power operated sanding and polishing machine having spaced pulleys 7 and 8, over which is stretched a belt 9 for grinding or polishing surfaces of varied configuration, the belt being maintained in operative relation with pulleys 7 and 8 by idler pulleys 10 of the spool type rotatably mounted on stub shafts 11 projecting from the sanding machine beneath the upper run of the belt as clearly shown in Fig. 2. Pulleys 7 and 8 are mounted on shafts 7a and 8a respectively driven by motors enclosed in casings 12 and 13 at opposite ends of the machine. Handles 14 and 15 are secured to the motor casings and project beyond the ends of the machine for manually supporting and directing the machine to the work.

In order to maintain the belt under proper tension when the machine is in use and to enable the belt to be changed when it becomes worn, or when a new operation is to be performed, motor casings 12 and 13 supporting shafts 7a and 8a and pulleys 7 and 8 are arranged for movement from and toward each other. To this end motor casing 12, for example, has a tubular extension or projection 16 extending therefrom and secured thereto in any suitable manner as by bolts 16a. In a similar manner motor casing 13 has a tubular member 17 secured thereto as by bolts 17a and extending therefrom into telescoping relation with tubular extension 16. By preference fluid pressure means utilize the telescoping relation of tubular members 16 and 17 to control the movement of casings 12 and 13 toward and from each other. Accordingly, motor casing 12 (Fig. 3) has an inner tubular member or cylinder 16b concentric with a rod 17b extending from member 17, the latter having a piston head 17c concentric with and slidably received within cylinder 16b. Suitable packing 17d is provided on piston head 17c to maintain a fluid tight seal. Pressure fluid, such as compressed air, may be admitted to the interior of cylinder 16b through a passage 18 from supply pipe 19 under control of a throttle valve 20 having a handle 21 for operating the same. Valve 20 is arranged to admit compressed air for forcing pulleys 7 and 8 apart, or to shut off the compressed air and to vent the piston chamber to atmosphere, thereby to permit pulleys 7 and 8 to be moved toward each other for removing or changing belt 9.

In order to maintain motor casings 12 and 13 with their pulleys 7 and 8 in the same angular relationship, outer cylinder 16, has one or more recesses 22 (Figures 3 and 4) receiving blocks 23, the latter being secured in place by machine screws 24. Block 23 has a rib or spline 23a received with a sliding fit in a groove 25 in inner tubular extension 17, thus providing a sliding keyed connection between tubular members 16 and 17. The ends of groove 25 may be closed as indicated at 25a (Fig. 3) to form stops in cooperation with splines 23a, thereby to prevent separation of the telescopingly engaged motor casings in the event that air control handle 21 should accidentally turn on the pressure fluid when belt 9 is not in place on pulleys 7 and 8. Piston head 17c may also engage motor casing 12 as a stop when the motor casings are moved toward each other. A guard plate 26 (Figs. 1, 2 and 6) secured to brackets 27 projecting from cylinder 16 and motor casing 12 may extend above the upper reach of belt 9 and slidably engage the under side of a shelf or bracket 28 on motor casing 13. Curved guard plates 27a and 28a may be hingedly mounted adjacent brackets 27 and 28 respectively to extend over and partly around the outer portions of pulleys 7 and 8 (Figs. 1, 2, and 5). A flexible sleeve or bellows 29 covers the joint between extensions 16 and 17 to exclude dust and grit.

Suitable means are provided for suspending the device in convenient relation to the work. To this end a bail 30 having one or more suspension eyes or sockets 31 (Figs. 1, 2, 6) is pivotally mounted at 32 upon a split ring 33 which is clamped, as by a bolt 34, over a bushing 35 (Figs. 3 and 6) between spaced transversely extending annular flanges 36 on outer tubular member 16. As clearly indicated in Fig. 6, bail 30 is bent so that suspension eye 31 is diametrically opposite pivot mounting 32 with ample room for the sanding and polishing machine therebetween. The machine is rotatable within ring 33 of the supporting device and is arranged to be maintained in a definite relation thereto. To this end outer tubular member 16 has a series of recesses 37 intermediate flanges 36, and bushing 35 has openings corresponding to these recesses (Fig. 6). An indexing plunger 38 is slidably mounted in ring 33 and is urged inwardly by a coil spring 39 to engage any one of recesses 37, thereby to fix and to maintain the desired angular relation of the device to the work and to the supporting bail 30. Plunger 38 is arranged to be retracted manually by the provision of a knob 40 thereon. In Figs. 1 and 2 the adjustment is such as to dispose belt 9 in horizontal position, while in Fig. 6 the belt would be in vertical position if the machine were shown in full detail.

While any desired type of motor may be used to drive each of pulleys 7 and 8, the machine shown in the drawings is equipped with electrical motors, one of which is shown in section and in full detail in Fig. 5. As shown pulley 8 is mounted directly upon shaft 8a which is the armature shaft of electric motor M. The motor is enclosed in motor casing 13 in a dust proof and water proof manner. Casing 13 adjacent pulley 8 has an annular extension 13b receiving anti-friction bearings 41 for shaft 8a with packings 42 and 43 inwardly and outwardly respectively of the bearings.

Packing 43 engages an inwardly projecting flange 8b on pulley 8 and is mounted in a closure 44 which telescopes over casing extension 13b and has screw-threaded connection with the latter. A rib 45 on closure 44 is concentric with ribs 46 and 47 on the inner face of pulley 8 and interfits with the latter to form a barrier preventing dust and grit from reaching packing 43 and bearings 41. The opposite end of motor casing 13 is partly closed by a perforated plate 48 supporting bearing 49 for the other end of shaft 8a and a cover plate 50 secured to plate 48 seals the opening around bearing 49.

In order to provide for adequate cooling of the motors M, casings 12 and 13 have series of slots 12a and 13a extending axially therethrough (Figs. 1, 3 and 5) but having no connection whatever with the sealed interior in which the motors are mounted. The spokes 7c and 8c of pulleys 7 and 8 are formed as fan blades to induce a flow of air over motor casings 12 and 13 respectively and through slots 12a and 13a. Power for operating the motors M is supplied by a cable 51 extending to switch box 52 whence separate cables 53 lead to casings 12 and 13, a single control switch 54 (Figs. 1 and 5) being utilized to control both motors.

From the above it will be apparent that the belt operating machine of the present invention is of simple construction in that it merely involves two motor casings having parts disposed in telescoping relation with resilient means within the telescoped parts for tensioning the belt, that the suspension means permit convenient disposition and maintenance of the machine with its operating belt at any desired angle, and that the motors which are fully enclosed and without gearing are fully protected from dust and water and yet adequately cooled through the provision of air slots in the casings and fan-shaped spokes on the pulleys.

While the invention has been herein disclosed in what is now considered to be its preferred form, it is to be understood that the invention is not limited to the specific details thereof, but covers all changes, modifications, and adaptations within the scope of the appended claims.

I claim as my invention:

1. In a grinding and polishing machine, supports disposed in spaced relation, belt pulleys rotatably mounted on said supports, tubular projections on said supports in telescoping relation and having stops to limit the movement of said supports toward and from each other, interfitting means within said projections providing an expansible chamber, and means for supplying pressure fluid to and for venting it from said chamber.

2. In a grinding and polishing machine, supports disposed in spaced relation, belt pulleys rotatably mounted on said supports, a belt mounted upon said pulleys and having an abrasive or polishing surface, tubular projections on said supports in telescoping relation and having stops to limit the movement of said supports toward and from each other, a cylinder within the outer of said tubular projections, a piston carried by the inner of said tubular projections to fit the interior of said cylinder and form an expansible chamber, and means for admitting an elastic pressure fluid to said chamber.

3. In a portable grinding and polishing machine having two motors and a pulley rotatably mounted on each motor, projections on said motors in slidable interfitting engagement permitting limited movement of said motors toward and from each other, means maintaining said motors against angular displacement, a belt on said pulleys to be driven by said motors, a guard supported by said projections and extending over said belt, and means comprising an expansible fluid for urging said motors apart to put said belt under tension.

4. A portable grinding or polishing machine having spaced motors, extensible means interposed between said motors comprising telescoping members, pulleys on said motors, an endless belt extending over said pulleys, the outer of said members having spaced annular flanges substantially centrally of said motors, a yoke rotatably fitting said outer member and confined between said flanges, and a suspension member secured to said yoke.

5. A portable grinding or polishing machine having spaced motors, extensible means interposed between said motors comprising telescoping members, pulleys on said motors, an endless belt extending over said pulleys, the outer of said members having spaced annular flanges substantially centrally of said motors, a yoke rotatably fitting said outer member and confined between said flanges, and a bail secured to said yoke and having an angular portion disposed beyond the side of said machine opposite to the point of attachment of said bail to said yoke.

6. A portable grinding or polishing machine having spaced motors, extensible means interposed between said motors comprising telescoping members, pulleys on said motors, an endless belt extending over said pulleys, the outer of said members having spaced annular flanges substantially centrally of said motors, a yoke rotatably fitting said outer member and confined between said flanges, means for selectively locking said yoke to said outer member in any one of a plurality of positions of rotative adjustment, and a suspension bail pivotally secured to said yoke and having an annular portion extending beyond the opposite side of said machine.

7. A portable grinding or polishing machine comprising two spaced supports, a belt pulley mounted upon each support, an endless abrasive belt mounted on said pulleys, each support having an extension projecting towards the other support in a direction parallel to said belt, said extensions telescoping with each other to provide an expansible chamber, said chamber being disposed between said supports and between said belt pulleys; and means for admitting an expansible pressure fluid to said chamber for yieldingly forcing said belt pulleys apart.

CHARLES B. COATES.